US010063543B2

(12) United States Patent
Alonso Cebrian et al.

(10) Patent No.: US 10,063,543 B2
(45) Date of Patent: Aug. 28, 2018

(54) COMPUTER IMPLEMENTED METHOD TO PREVENT ATTACKS AGAINST USER AUTHENTICATION AND COMPUTER PROGRAMS PRODUCTS THEREOF

(71) Applicant: TELEFONICA DIGITAL ESPANA, S.L.U., Madrid (ES)

(72) Inventors: Jose Maria Alonso Cebrian, Madrid (ES); David Barroso Berrueta, Madrid (ES); Jose Maria Palazon Romero, Madrid (ES); Antonio Guzman Sacristan, Madrid (ES)

(73) Assignee: TELEFONICA DIGITAL ESPANA, S.L.U., Madrid (ES)

( * ) Notice: Subject to any disclaimer, the term of this patent is extended or adjusted under 35 U.S.C. 154(b) by 0 days.

(21) Appl. No.: 14/311,911

(22) Filed: Jun. 23, 2014

(65) Prior Publication Data
US 2014/0380453 A1    Dec. 25, 2014

(30) Foreign Application Priority Data

Jun. 24, 2013 (EP) .................................. 13382237

(51) Int. Cl.
*H04L 29/06* (2006.01)

(52) U.S. Cl.
CPC .......... *H04L 63/0869* (2013.01); *H04L 63/08* (2013.01); *H04L 63/0838* (2013.01); *H04L 63/108* (2013.01)

(58) Field of Classification Search
CPC .................................................. H04L 63/0869
See application file for complete search history.

(56) References Cited

U.S. PATENT DOCUMENTS

| 6,895,510 | B1 * | 5/2005 | Benantar | H04L 63/0869 |
| | | | | 726/9 |
| 7,043,455 | B1 * | 5/2006 | Cuomo | G06Q 20/3674 |
| | | | | 705/50 |
| 2005/0097060 | A1 * | 5/2005 | Lee | G06Q 20/02 |
| | | | | 705/65 |
| 2005/0216555 | A1 * | 9/2005 | English | G06Q 50/18 |
| | | | | 709/204 |
| 2007/0204168 | A1 * | 8/2007 | Cameron | G06F 21/33 |
| | | | | 713/185 |
| 2008/0301785 | A1 * | 12/2008 | Beyer | H04L 63/08 |
| | | | | 726/5 |
| 2009/0319795 | A1 * | 12/2009 | Sharif | G06F 21/64 |
| | | | | 713/176 |

(Continued)

*Primary Examiner* — Simon P Kanaan
(74) *Attorney, Agent, or Firm* — Sughrue Mion, PLLC (57) ABSTRACT

The computer implemented method comprising: receiving a first server a request in the name of a user to be logged into a service of said first server and authenticating said request by verifying user identification information of said user, wherein a second server in connection with a user computing device with a dedicated program is used for: receiving a request about a status associated to said user; initializing a credential exchange in order to provide mutual authentication; verifying said associated status that has been previously set as valid or as invalid by said user; and sending said associated status to said first server wherein the latter allows the logging of said request or rejects it if said associated status is set as valid or as invalid.

18 Claims, 3 Drawing Sheets

(56) References Cited

U.S. PATENT DOCUMENTS

| | | | |
|---|---|---|---|
| 2011/0296529 A1* | 12/2011 | Bhanoo | G06Q 20/356 726/26 |
| 2012/0066517 A1* | 3/2012 | Vysogorets | G06F 21/34 713/193 |
| 2013/0174241 A1* | 7/2013 | Cha | H04L 63/0815 726/7 |
| 2013/0212663 A1* | 8/2013 | Edge | H04W 12/06 726/7 |
| 2013/0311380 A1* | 11/2013 | Vines | G06Q 20/36 705/66 |
| 2013/0312073 A1* | 11/2013 | Srivastav | H04L 9/3215 726/7 |
| 2013/0318348 A1* | 11/2013 | Lebron | H04L 63/0428 713/168 |
| 2014/0380453 A1* | 12/2014 | Alonso Cebrian | H04L 63/0838 726/9 |

* cited by examiner

COMPUTER IMPLEMENTED METHOD TO PREVENT ATTACKS AGAINST USER AUTHENTICATION AND COMPUTER PROGRAMS PRODUCTS THEREOF

FIELD OF THE ART

The present invention is directed in general to authentication systems, and more particularly to a computer implemented method and computer program products to prevent attacks against user authentication that improve the overall security in an authentication system, minimizing the impact on the usability and deployability of these systems.

BACKGROUND OF THE INVENTION

In recent years, web fraud detection market has increased considerably, so innovation in authentication methods has become of great importance.

General access control systems provide methods for Authentication, Authorization and Audit (or Accountability). The process of authorization is distinct from that of authentication. Whereas authentication is the process of verifying that "you are who you say you are", authorization is the process of verifying that "you are permitted to do what you are trying to do". Authentication and authorization are often combined into a single operation, so that access is granted based on successful authentication. Authenticators are commonly based on at least one of the following four factors: something you know, something you have, something you are, and where you are.

The vulnerable security architecture in many computer applications leads to the common problem of authentication hacking attacks. Authentication attacks target and attempt to exploit the authentication process a computer-based system uses to verify the identity of a user, service, or application. The Open Web Application Security Project (OWASP) Foundation has published a comprehensive list of threats to Authentication methods showing an array of tricks, techniques, and technologies that exist to steal passwords, attack password systems, and circumvent authentication security. According with Burr, W. E. et. al [1] this list of authentication process threats can be structured into the following categories:

TABLE 1

| Categories of attacks over Authentication Process (NIST) | |
|---|---|
| Online Guessing | An Attacker performs repeated logon trials by guessing possible values of the token authenticator. |
| Phising | A user is lured to interact with a counterfeit verifier, and tricked into revealing his or her token secret, sensitive personal data or authenticator values that can be used to masquerade as the Subscriber to the Verifier. |
| Pharming | A user who is attempting to connect to a legitimate verifier, is routed to an attacker's website through manipulation of the domain name service or routing tables |
| Eavesdropping | An attacker listens passively to the authentication protocol to capture information which can be used in a subsequent active attack to masquerade as the user. |
| Replay | An attacker is able to replay previously captured messages (between a legitimate user and a verifier) to authenticate as that user to the verifier. |
| Session hijack | An attacker is able to insert himself or herself between a user and a verifier subsequent to a successful authentication exchange between the latter two parties. The attacker is able to pose as a user to the verifier/RP or vice versa to control session data exchange. |
| Man-in-the-middle (MitM) | The attacker positions himself or herself in between the user and verifier so that he or she can intercept and alter the content of the authentication protocol messages. The attacker typically impersonates the verifier to the user and simultaneously impersonates the user to the verifier. Conducting an active exchange with both parties simultaneously may allow the Attacker to use authentication messages sent by one legitimate party to successfully authenticate to the other. |
| Denial of Service | The attacker overwhelms the verifier by flooding it with a large amount of traffic over the authentication protocol; |
| Malicious code | The attacker may compromise or otherwise exploit authentication tokens and may intercept all input or output communications from the device (Man-in-the-device (MitD) or Man-in-the-Browser (MitB)) |

It is possible to implement a range of countermeasures to the authentication attacks described above. This invention proposes a novel approach against some authentication attacks that it is authentication agnostic, completely independent of any authentication procedure.

There are different alternatives to strengthen existing authentication schemes. The security in the exchange of information is generally implemented with SSL/TLS or EVC/SSL. But the way this information is selected to be associated to a user identity can be quite different for different authentication schemes. Therefore it is crucial to perform an in-depth study of such schemes to reveal their shortcomings. It can be stated that at present the two factors-based schemes predominate in most systems.

For instance, Bonneau J. et. al [2] proposes the following definition of authentication procedures categories:

Traditional Scheme. In this security scheme depends on the user. The user must create a strong password and make sure not be easily compromised.

Proxy-based. Proxy-based schemes are based on the definition of a service between the client and the server (man-in-the-middle) which manages the authentication process using one-time-password.

Federated Single Sign-On. They allow websites to delegate its user's identification to a trusted identity server that manages the entire authentication process.

Graphical. These schemes seek to exploit the human ability to recognize images to remove the need for password.

Cognitive. These schemes are challenge/response-based. The user must demonstrate her knowledge of a secret without having to disclose it. Normally the server expects that a user will be able to perform a cryptographic hash of the secret along with a nonce generated by the server.

PaperToken. It uses a physical storage (paper) of a set of indexed passwords. The authentication scheme assumes that the server asks the user the corresponding key to a specific index.

VisualCrypto. Quite similar to paperToken, but with a system of complex key storage that leverages the features of the display used by the client and the way in which humans perceive colors Hardware Tokens. The secrets are stored on a hardware module that users must keep with them. They are based on the same principles as Cognitive schemes but the answer to the challenge that sends the server, is provided by the user's hardware token.

Phone Based. It is a token-based scheme but instead of using a specific hardware for the storage and computation of the key, it uses the phone as key storage and the phone processor as substitute of specific cryptographic hardware.

Biometric. These schemes avoid the use of the password, basing the user authentication into something that defines them, not something you have or something you know.

Recovery. These schemes are complementary to any authentication scheme based on passwords. And allow easier retrieval of information necessary to authenticate in case of lost.

It is noteworthy that some of the authentication schemes do not belong to only one category and that most institutions use at least two or more of these schemes, as it is the case in Google Authenticator product (a two-factor authentication system based on a mobile application or SMS messaging).

Different criteria can be defined to establish comparison between authentication schemes. In [2] the authors suggest the need to define three criteria in order to perform an effective comparison. These aspects are: security, usability and complexity on implementation (deployability). [2] Presents an intensive study to instrument the comparison through the definition of metrics. Table 2 summarizes the metrics defined for each criterion.

TABLE 2

Design metrics for Authentication Schemes

| | |
|---|---|
| Usability | Memory-Effortless |
| | Scalable-for-Users |
| | Nothing-to-Carry |
| | Physical-Effortless |
| | Easy-to-Learn |
| | Efficient-to-Use |
| | Infrequent-Errors |
| | Easy-recovery-from-Loss |
| Deployability | Accessible |
| | Negligible-Cost-per-User |
| | Server-Compatible |
| | Browser-Compatible |
| | Mature |
| | Non-Proprietary |

TABLE 2-continued

Design metrics for Authentication Schemes

| | |
|---|---|
| Security | Resilient-to-Physical-Observation |
| | Resilient-to-Targeted-Impersonation |
| | Resilient-to-Throttled-Guessing |
| | Resilient-to-Unthrottled-Guessing |
| | Resilient-to-Internal-Observation |
| | Resilient-to-Leaks-from-Other-Verifiers |
| | Resilient-to-Phishing |
| | Resilient-to-Theft |
| | No-Trusted-third-Party |
| | Requiring-Explicit-Consent |
| | Unlinkable |

In the case of security criterion, the proposed metric set summarizes all the aspects that are usually estimated in defining a threat model. In the definition of these models is necessary to adopt a number of decisions, defining these decisions the working scenario. For example in the case of OAuth 2.0 [3] the adopted assumptions are as follows:

The attacker has full access to the network between the client and authorization servers and the client and the resource server, respectively. The attacker may eavesdrop on any communications between those parties. He is not assumed to have access to communication between the authorization server and resource server.

An attacker has unlimited resources to organize an attack.

Two of the three parties involved in the OAuth protocol may collude to mount an attack against the third party. For example, the client and authorization server may be under control of an attacker and collude to trick a user to gain access to resources.

On another hand, passwords have high customer acceptance, they are based on a shared secret and one needs to have a different one for each service provider. The problem is that passwords rely on the user's memory and adherence to good password practices. However, anecdotal evidence shows that a significant proportion of customers will not follow good password practices and attacks usually work by obtaining the password. This is a severe breach of security as the attacker is then able to operate as the customer until the breach is discovered.

Hardware tokens are generally considered to support stronger security, but they are still susceptible to malicious code attacks that can prompt the token for an authentication request. Authorised insiders may also abuse their privileges and be able to obtain stored cryptographic keys. Software tokens have lower costs than hardware tokens, but the trade-off is that copying attacks become viable.

All one-time password systems need to be used in conjunction with communication channel protections. As mutual authentication is not supported, verifier impersonation attacks are possible. This means there is some exposure to the phishing attacks, although the potential for success with such attacks is far more limited than with password systems. The exposure to coping attacks depends on the product.

When communication channel protections are used, even biometrics-based authentication schemes are still susceptible to attacks that copy the biometric data. Such attacks are likely to become more popular if biometrics are more widely used. Because biometrics are personal data, privacy is an issue with regard to the storage, use and transfer of biometric data.

In [1] four different levels are defined in terms of the consequences of authentication errors and misuse of credentials. Level 1 is the lowest level (the most insecure) and level 4 is the highest. From the table 1 the next matching can be done.

Level 1—Protection against online guessing and replay attacks. NIST recommends use a single or multi-factor authentication with no identity proof.

Level 2—Protection against eavesdropping and all the attacks from the level 1. NIST recommends single or multi-factor authentication.

Level 3—Protection against verifier impersonation, MitM attacks and the attacks from level 2. NIST recommends a multi-factor authentication and wide use of OTP. It also suggests a token used for authentication to be unlocked by the user using a password or biometrics.

Level 4—Protection against session hijacking and the attacks from the level 3. NIST suggests employing Multi-factor authentication with FIPS-140-2 certified tamper-resistant hardware (hardware tokens).

Attending to the metrics introduced above, is possible to determine that solutions corresponding to the higher security level (level 4) have poor performance in deployability and usability. Once the assessment of a system allows to determine in which level has to be deployed its authentication system, it is needed to evaluate if the users are authenticated safely and correctly. Although there are some tools that aid in this task, as the ones presented by Dalton, M. et. al [3] or by Sun, F. et al [4], deploys in the level 4 are difficult to evaluate correctly. In terms of usability, the use of tampering resistant hardware tokens goes against the adoption of these solutions by users, and it has been proved that this situation leads to a misuse of the credential systems. A different approach is needed that improves the overall security in the authentication systems, whatever it is the scheme or schemes (multi-factor) adopted, minimizing the impact on the usability and deployability of these systems.

REFERENCES

[1] Burr, W. E., Dodson, D. F., & Polk, W. T. (2006). Electronic authentication guideline. NIST Special Publication, 800, 63.
[2] Bonneau, J., Herley, C., van Oorschot, P. C., & Stajano, F. (2012, May). The quest to replace passwords: A framework for comparative evaluation of web authentication schemes. In Security and Privacy (SP), 2012 IEEE Symposium on (pp. 553-567). IEEE.
[3] Michael Dalton, Christos Kozyrakis, and Nickolai Zeldovich, Nemesis: Preventing Authentication & Access Control Vulnerabilities in Web Application, In Proceedings of the 18th conference on USENIX security symposium, (pp. 267-282) USENIX Association.
[4] Sun, F., Xu, L., & SU, Z. (2011, August) Static detection of Access control vulnerability in web applications. In Proceedings of the 20th USENIX conference on Security (pp. 11-11). USENIX.

DESCRIPTION OF THE INVENTION

To achieve the above, the invention provides a solution designed to limit the exposure time in which an authentication attack in the name of a user can be done. Therefore, supposing a limit on the resources available to perform said attack, that now, at least in terms of time, can be consider not infinite.

To that end, the invention provides in a first aspect a computer implemented method to prevent attacks against user authentication, comprising receiving a first server a request in the name of a user to be logged into a service of said first server; and authenticating said request, said first server, by verifying user identification information of said user.

The computer implemented method of the first aspect comprises, on contrary of the known proposals, and in a characteristic manner, using a second server in connection with a user computing device with a dedicated program comprising: receiving from said first server a request about a status associated to said user, that it to the user account with the first server; initializing a credential exchange between said first and second server in order to provide mutual authentication; verifying said associated status that has been previously set as valid or as invalid by said user and stored in a memory of said second server; and sending said associated status to said first server. Furthermore, the computer implemented method uses said first server for: logging said request in the name of said user if said associated status is set as valid, or rejecting said logging if said associated status is set as invalid.

The associated status set as valid or as invalid can be modifiable by said user whenever the latter want it. For instance, the user can plan a locking/unlocking policy to automate the management of their accounts held with different servers using different criteria: time, geolocation (different policies for home, work, etc.). Another possibility for modifying said associated status can be by delegating the control said user has of their accounts to other users. This can be done by considering two different options. In the first one, a parental control mechanism is used so the children's (original) accounts access control is delegated to said parent control mechanism. In the second one, a single account allows multiple locks. In this latter case, the unlock action will require that multiple users unlock their locks concurrently. In both cases, the delegation is performed securely maintaining the privacy of every user unchanged.

The status request associated to said user comprises the sending of a security token, said security token being generated during a previous pairing user accounts process. This token links the user with said first server without disclosure of any personal information of said user to said second server information. Then, the token is securely stored in a memory of said first server and in a memory of a said second server once the user has configured the pairing of said first and second servers' identifications.

The credentials exchange to secure mutual authentication between the first server and the second server, is performed, preferably, via a standard authentication procedure based on certificates' exchange defining, as a result, a secured channel. As said before, said exchange is performed to verify that both first server and second server are who they claim to be.

In addition, in a preferred embodiment, the step of sending said associated status to said first server can include the sending of a unique identifier for said user, for instance, the sending of a one-time password (OTP), so that a second authentication factor can be activated for said first server or several servers who do not provide this option in their login processes.

The received request can be recorded in order to provide statistics via said user computing device. In this way, the user can obtain system usage statistics that reflect activity of the system and track the attempts of impersonation. These statistics inform about when someone had attempted to access to a service with user's username.

The second server can notify to said user, in another embodiment, if said logging rejecting has occurred. For instance, by the sending of a Short Message Service (SMS), of an email, of or a message by a smartphone messenger application, or just by the highlighting or pushing in a dedicated program of said user computing device.

The invention provides in a second aspect a computer program product loadable into a second server to prevent attacks against user authentication, comprising several software modules that are executed into said second server for executing the steps of: receiving from a first server a request about a status associated to said user; initializing a credential exchange between said first and second server in order to provide mutual authentication; verifying said associated status, said associated status being previously set as valid or as invalid by a user from a dedicated program of a user computing device, such as a mobile phone, a smartphone, a tablet-PC or a PDA among any other computing device of similar characteristics, in communication with said second server and being stored in one of said several software modules; and sending said associated status to said first server.

The computer program product can include, in a preferred embodiment, a second-factor authentication software module for sending a unique identifier to said second server and to said first server.

The present invention does not propose any new authentication scheme. Indeed, the intention is to complement the schemes listed above to increase their security. Although this may limit its usability and deployability, the second server design is oriented to minimize the impact over these criteria. The authentication scheme choice determinates the security risk that is assumed for a system. What is proposed here is to reduce the risk taken with the choice of authentication mechanism reducing the time in which this system is accessible to be broken.

In table 1 a complete authentication attacks classification has been presented. The five first categories include attacks that intend to capture a user password to perform an attack later. Online guessing even requires a constant access to the authentication process. In the next four attacks, once the password is captured and broken, the attacker has to request for authentication process, impersonating the legitimate user. This process is time consuming and it supposes that the attacker interacts with the authentication system directly. This means the proposed invention optimizes the authentication process regardless of the authentication scheme chosen. Furthermore, with said second factor for authentication, the invention grants protection against impersonation and MitM attacks even to services that have been implemented only with protection against online guessing, eavesdropping or replay attacks. And this is done without increasing the complexity of implementing authentication systems and without a significant deterioration of the solution usability. Therefore, this solution allows homogenize security levels of different accounts of a user.

It is possible set certain comparisons with proxy-based authentication solutions, with Federated Single Sign-on solutions or, even, with Phone-based solutions. However, in no case the present invention replaces any authentication server. With this solution, any authentication scheme would be strengthened by reducing the exposure time and, if needed, would expand its functionality by enabling a second factor of authentication if so requested by the user.

It is true that there is some similarity with mobile solutions that provide as an alternative to the use of hardware tokens. However, the need of having the phone or computing device at hand at all authentication processes is attenuated in the present invention. Once the user has unlocked the login processes for different servers, these remain unlocked until the user re-locks them. Once the user configures a period of time when service must be locked, the user could access to their account always if she does this out of this period. It will not be necessary that the user have the phone at hand to complete the login in the system unless their hats demand a second factor for authentication.

Resources access control systems are another comparison that can be set. These systems usually act as an "authorization manager" that allows users to coordinate the protection of the resources that the user owns by defining policies associated with each resource. In this way, the user controls how to make the sharing of these resources with third parties. In the particular case of UMA proposes a scheme that facilitates the centralization of these policies. UMA also facilitates the integration with OpenID and OAuth, sharing a number of basic processes and complement the functions available to users for authentication and authorization delegation. One of these basic functions is authorization from an authenticated identity. That is, to establish mechanisms for authorization, previously it is necessary to authenticate users. The present invention arises, at this point, as a solution that compliments the authentication process before authorization. Reduces the risk of identity theft and is proposed as a layer supports these authentication systems.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF SEVERAL EMBODIMENTS

Figure 1:
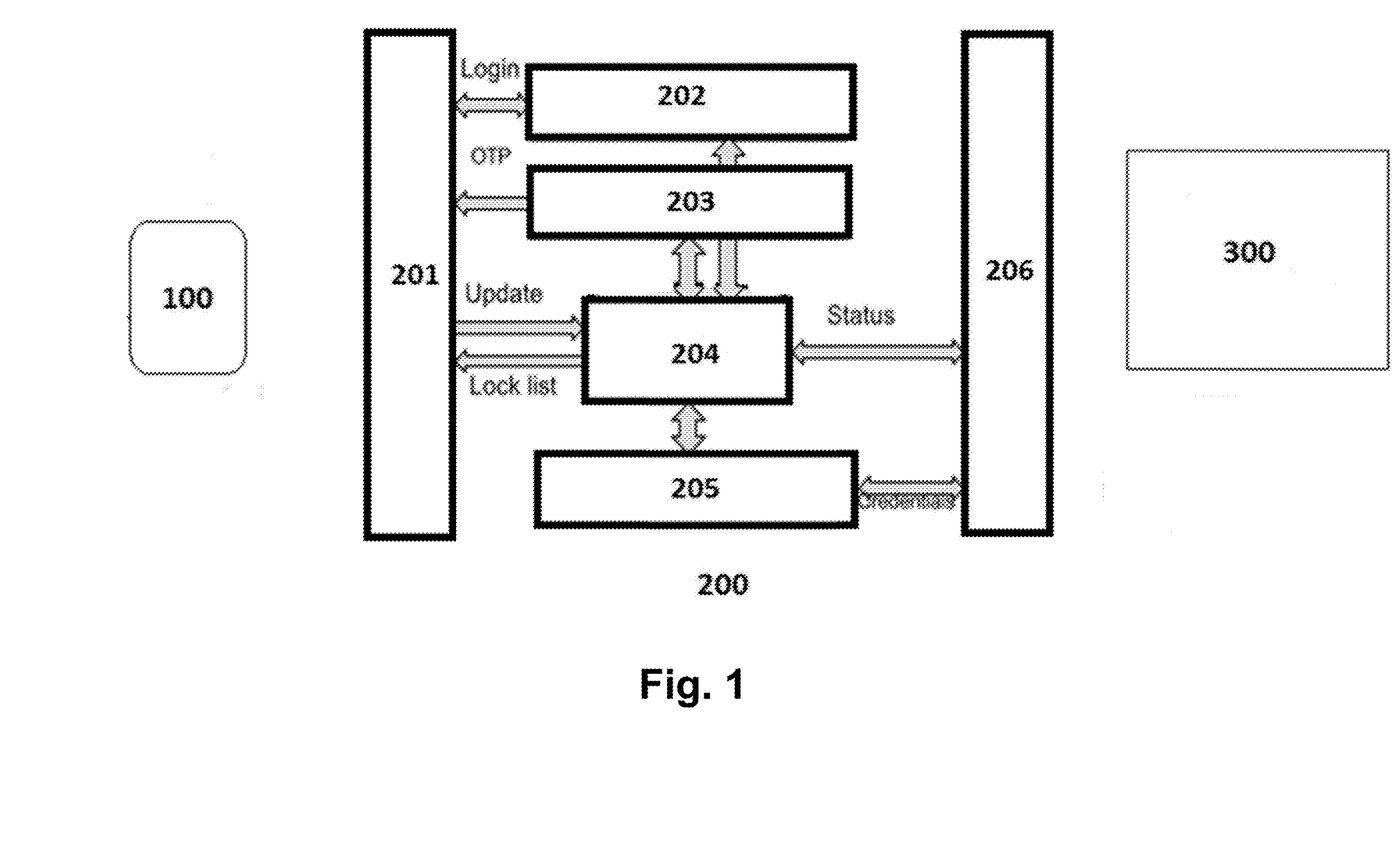
FIG. 1 is an illustration of the present invention general architecture.

In reference to FIG. 1 it is showed the general architecture of the present invention. Concerning FIG. 1, a user computing device 100 such as a mobile phone, a smartphone, a tablet-PC or a PDA among any other, is used by said user in order to login into a dedicated program 101 in communication with a second server 200 and to manage the status for every first server 300 with which a user wants to request a service.

According to some embodiments, the user, by means of said user computing device 100, can set up the accounts their have with several servers 300 with different options. For instance, the user can fix a scheduling to lock/Unlock every account. It is possible to schedule what will be the service status for every day and every hour in a week or for time periods in a year. In addition, the user can also improve the security level of a service; not only by reducing the exposure time, but by configuring a second factor authentication or can even delegate the control of their accounts to other users using said dedicated program 101. This delegation is performed securely and maintaining the privacy of every user unchanged, Only an identification ID is needed. Finally, the user can obtain system usage every account statistics that reflect activity of the system and track the attempts of impersonation.

A User Interface defines an interface 201 between the users and the second server 200. It also defines and controls the exchange of credentials between users and the second server 200 to build a secured channel. Once this channel is defined, this interface 201 grants the capability of create new locks in the second server 200. Through this interface 201 it is possible to retrieve the configuration of the user account from the second server 200. It permits the user can modify this configuration and can obtain the statistics of their accounts. It also facilitates the management of a unique identifier (such as an OTP) in order to build said second factor-based authentication.

A User Account Manager 202 stores the user account data and implements the authentication mechanism for identify and validate the user. The basic mechanism proposes a username and/or a password scheme, but the invention is designed to integrate multiple factors for authentication like geolocalization, profiling from user's preferences, biometry, etc.

A First Server Service Manager 205 stores information about communication with said first servers or several servers 300. It manages the certificates used to grant a secured interchange between the second server 200 and the first server or several servers 300. Several ways of get these certificates have been implemented, for instance, the second server 200 can generate a valid certificate for a first server 300 or this first server 300 can bring a public certificate that the second server 200 could validate.

A Second-Factor Authentication Module 203, in case the user has set up a lock with a second factor for authentication, according to a preferred embodiment, will incorporate all the needed logic for the generation and emission of an OTP-by-Push, OTP-over-SMS or OTP-over-email. When the second server 200 receives a request from the first server 300 asking for the user account status, a second factor of authentication is triggered. An OTP, for instance, is generated and sent to the user. The same OTP is sent to the first server 300 along with the account status. If the status is ON and the user has activated the second factor, the first server 300 waits for the user to introduce the OTP to proceed with the login. This module 203 allows raising the security level of an organization to a level 3 according to [1] as it has been stated before.

An Account-Locker Core 204 implements the main function of the second server 200, that is, lock or unlock a user account with a first server 300. In order to do that, this module 204 accepts and processes the status requests sent from the first server 300. This module 204 also manages all data about the accounts with said other several servers 300 defined by the users and the requests for the pairing of new locks. The key is the user is never asked for any private information. Once the user creates their account with said dedicated program 101, the user can establish locks with different several servers 300.

To activate these locks, the second server 200 can generate a token. This token and the definition of secured channels are used in the pairing process between user and first server 300. As a result of this pairing process, a token, which can be encrypted for protection purposes, is sent to the first server 300 who has to store this information with their user's personal data. Later, this token will be used to request the corresponding lock status.

A first server Interface defines an interface 206 between the second server 200 and the first server or several servers 300. It defines and controls the exchange of credentials between the second server 200 and said servers 300 to build a secured channel. Once this channel is defined, this interface 206 grants the capability of create new locks. It defines a channel to receive and send the information relative to the locks status. It also defines the way a first server 300 can send any extra information in order to enhance the statistics offered to the users (Geolocation from where the attempt of login has been done, IP from where the attempt of login has been done, if the user had the correct password, etc.).

Figure 2:
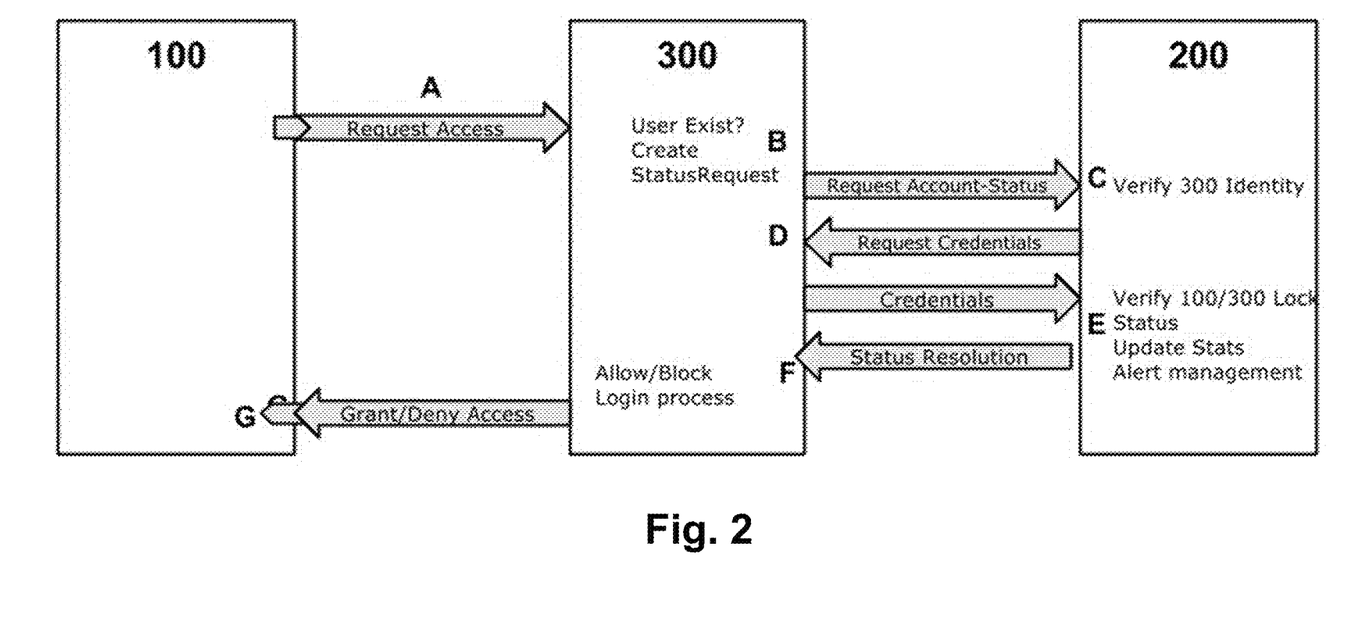
FIG. 2 is an illustration of the present invention blocking mechanism general scheme, according to an embodiment.

In reference now to FIG. 2, a user requests, according to an embodiment, to be logged in a service (A) of a first server 300 so once user existence has been validated (B) by said first server 300, the latter demands to the second server 200 the user account status (C). Then the second server 200 initializes the credentials exchange (D and E) before the account status information is sent (F). With the status the first server 300 makes the decision of allowing or blocking the user access (G).

When a first server 300 sends a Request Status, the second server 200 understands that someone, with the proper service identification information (i.e. ID and password), is trying to access to the service. If the account status is set as blocked, or if this request has come in a moment that is not included in the interval defined by the user, the second server 200 registers this event as a fake attempt. The second server 200 could send an alert of this event to the user if said user has configured it so (for instance by sending a Short Message Service (SMS), an email, a message by a smartphone messenger application, by a highlighting or pushing in said dedicated program 101 of said user computing device 100, etc.) or just update the statistics for a later revision. Then the second server 200 returns the status associated with the account as locked.

As an exemplary embodiment to illustrate the use of this invention, it is considered a user who had blocked the use of their credit card. This user also had configured, by means of said dedicated program or computing device application, to receive all failed login attempt alerts as a SMS on their computing device (i.e. a mobile phone). On the other hand, once the second server or also named Account-Locker notifies the first server or Service Provider (in this case that issued the credit card) that the legitimate user of this account had blocked the service, it may in turn start with immediate actions to preserve their assets against fraud attempts (by credit limits, monitoring this service, etc.).

Figure 3:
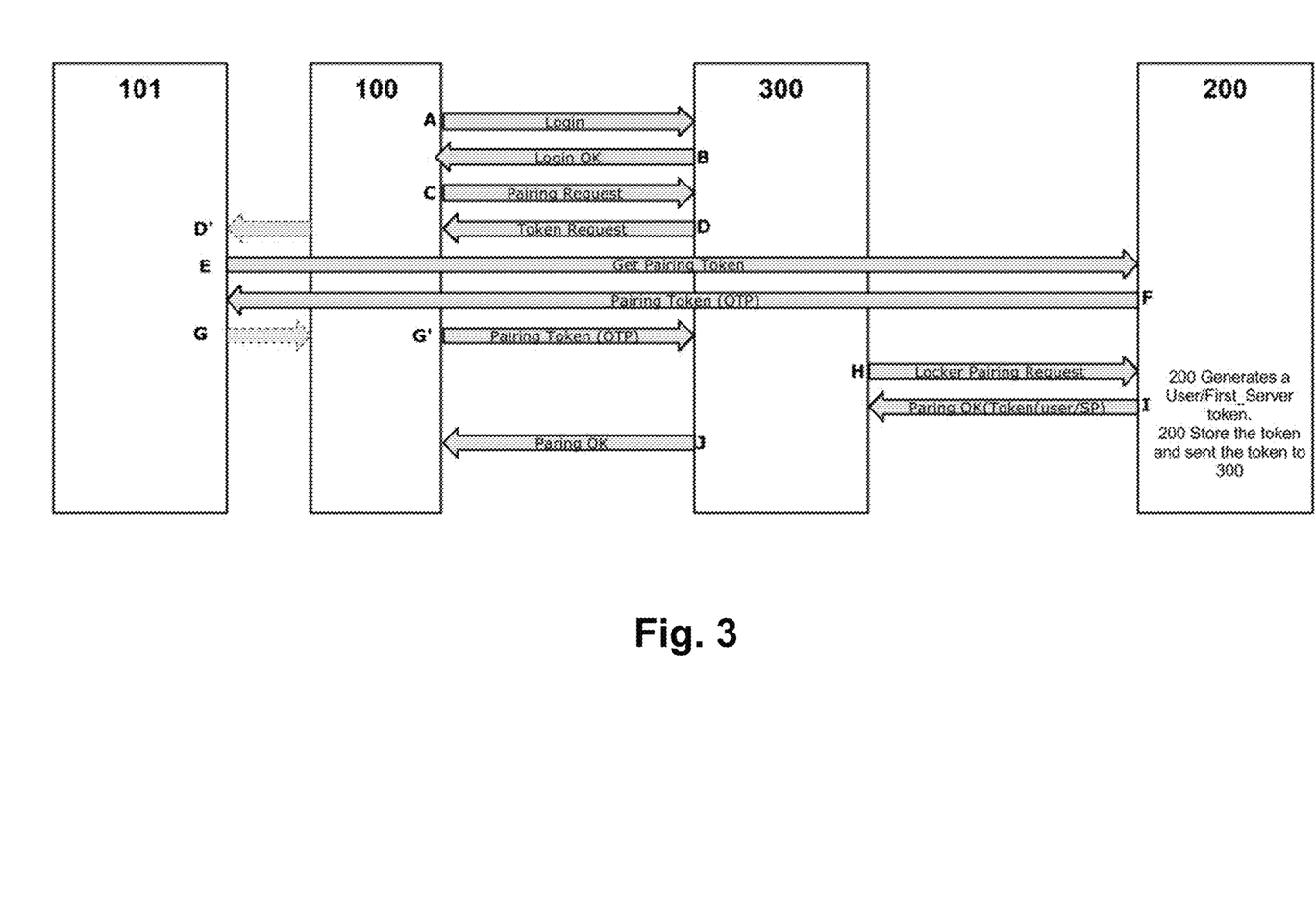
FIG. 3 is an embodiment on how the present invention works in order to perform an account pairing.

In another embodiment, in reference to FIG. 3 it is showed the pairing process of the user account of the second server 200 with different accounts for different first servers 300. In FIG. 3, once a user, using for instance a browser 100, has completed the login process (A-B) with a first server (in this particular case a Bank online, a social network, a credit card providers, etc.), the user decides perform said accounts' pairing process. The user requests the pairing to the first server 300 (C). As response, the first server 300 asks for a pairing token (D). The user then uses the dedicated program 101 (D') to get this pairing token from the second server 200 (E), after a previous login process. The second server 200 generates a token (for instance as an OTP) and sends it to the user's dedicated program 101 (F). This token can be used for several pairing processes meanwhile it is valid. The user get the token (OTP) from the dedicated program 101 and introduces it in the web page displayed in the browser 100 by the first server 300 (G-G'). The first server 300 then sends the received token to the second server 200, after a previous credentials exchange (H). If the first server 300 identity is validated, the second server 200 stores the link between the user and the first server 300 and generates a new token that identifies this link. This token (User/First Server) is sent to the first server and there it is stored for future communications (I). At last, a pairing acknowledges is sent to the user's browser 100 (J).

The present invention, would be also useful for authorizing operations such as transactions for an electronic payment, among many others examples. In this particular case, the proposed method and system would be extended. For instance, the first server 300 instead of receiving a request in the name of a user to be logged into a first server service will receive a request in order to perform an operation therein, in which said request it will be authorized by the first server 300. Then, after the second server 200 executes its common tasks (i.e. credential exchange initialization, associated status verification, etc.) as executed in previous embodiments, the first server 300 it may authorize said request or reject it, depending of the associated status provided by the user, hence providing a safer mechanism for authorizing operations.

The scope of the present invention is defined in the following set of claims.

The invention claimed is:

1. A computer implemented method to prevent attacks against user authentication, the method comprising:
   prior to user authentication with a first server, receiving by the first server a login request from a first user in a name of a second user to be logged into a service of the first server;
   transmitting, by the first server to a second server, a request for a user status associated with the second user;
   in response to transmitting the request, initializing a credential exchange between the first server and the second server to provide mutual authentication, and in response to a successful mutual authentication, verifying the user status associated with the second user that has been previously set as valid or as invalid by the second user and stored in a memory of the second server, and sending, by the second server, the user status to the first server;
   receiving, by the first server, the user status and using the received user status to:
   authorize the login request from the first user in the name of the second user in response to the user status being set as valid; and
   rejecting the login request from the first user in the name of the second user in response to the user status being set as invalid,
   wherein in response to the login request being authorized and an operation request from the first user in the name of a second user to perform an operation in the first server using at least a part of resources of the first server:
   transmitting, by the first server to the second server, a request for a user status associated with the second user,
   initializing a credential exchange between the first server and the second server,
   in response to a successful credential exchange, verifying the user status associated with the second user as valid or invalid,
   sending, by the second server, the user status to the first server, and
   authorizing the operation request in response to the user status being set as valid, and
   rejecting the operation request in response to the user status being set as invalid.

2. The computer implemented method according to claim 1, wherein the request for user status includes a security token that was generated and stored in the first server after a previous successful user account pairing process between the first server and the second server, and
wherein the security token is encrypted.

3. The computer implemented method according to claim 1, wherein the request for user status includes a unique identifier of the second user.

4. The computer implemented method according to claim 1, wherein rejecting the login request comprises notifying the second user that the login request is rejected.

5. The computer implemented method according to claim 4, wherein the notifying comprises one of a sending of a Short Message Service (SMS) message to the second user, a sending an email to the second user, a sending of a message to the second user by a smartphone messenger application, or a highlighting or pushing in a dedicated program of a user computing device from which the login request was received.

6. The computer implemented method according to claim 1, wherein the received login request is recorded in the first server.

7. The computer implemented method according to claim 1, wherein the user status is modifiable.

8. The computer implemented method according to claim 1, wherein the user status if verified based on one or more parameters and the one or more parameters comprise a period of time in which the user status is valid.

9. A non-transitory computer readable medium storing a program causing a computer to execute a method comprising:
   prior to user authentication with a first server, receiving by the first server a login request from a first user in a name of a second user to be logged into a service of the first server;
   transmitting, by the first server to a second server, a request for a user status associated with the second user;
   in response to transmitting the request, initializing a credential exchange between the first server and the second server to provide mutual authentication, and in response to a successful mutual authentication, verifying the user status associated with the second user that has been previously set as valid or as invalid by the second user and stored in a memory of the second server, and sending, by the second server, the user status to the first server;
   receiving, by the first server, the user status and using the received user status to:
   authorize the login request from the first user in the name of the second user in response to the user status being set as valid; and
   rejecting the login request from the first user in the name of the second user in response to the user status being set as invalid,
   wherein in response to the login request being authorized and an operation request from the first user in the name of a second user to perform an operation in the first server using at least a part of resources of the first server:
   transmitting, by the first server to the second server, a request for a user status associated with the second user,
   initializing a credential exchange between the first server and the second server,
   in response to a successful credential exchange, verifying the user status associated with the second user as valid or invalid, sending, by the second server, the user status to the first server, and authorizing the operation request in response to the user status being set as valid, and rejecting the operation request in response to the user status being set as invalid.

10. The non-transitory computer readable medium according to claim 9, wherein the request for user status includes a unique identifier of the second user.

11. The non-transitory computer readable medium according to claim 9, wherein the login request is received from a mobile phone, a smartphone, a tablet-PC, or a PDA.

12. The non-transitory computer readable medium according to claim 9, wherein the request for user status includes a security token that was generated and stored in the first server after a previous successful user account pairing process between the first server and the second server, and.

13. The computer implemented method according to claim 1, wherein the user status is a lock/unlock status set by the second user according to a lock/unlock policy.

14. The non-transitory computer readable medium according to claim 9, wherein the user status is a lock/unlock status set by the second user according to a lock/unlock policy.

15. The computer implemented method according to claim 2, wherein the security token links the second user with the first server without including personal information of the second user.

16. The non-transitory computer readable medium according to claim 12, wherein the security token links the second user with the first server without including personal information of the second user.

17. A computer implemented system comprising:
a first server and a second server,
wherein the first server comprises at least one microprocessor configured to:
  prior to user authentication with the first server, receive a login request from a first user in a name of a second user to be logged into a service of the first server;
  transmit to the second server a request for a user status associated with the second user;
  receive by the first server a request from the second server for credentials of the first server, and transmitting the credentials of the first server to the second server to perform a credential exchange between the first server and the second server;
  in response to a successful credential exchange, receive a status resolution of the user status from the second server; and
  authorizing the login request of the first user in the name of the second user when the status resolution indicates the user status is valid; and
  reject the login request of the first user in the name of the second user when the status resolution indicates the user status is invalid, and
wherein the second server comprises at least one microprocessor configured to:
  receive from the first server the request for the user status of the second user;
  transmit the request for credentials to the first server, and receive the credentials from the first server;
  verify the credentials of the first server;
  in response to successfully verifying the credentials of the first server, verify the user status associated with the second user that has been previously set as valid or as invalid by the second user and stored in a memory of the second server, and in response to verifying the user status, transmit to the first server the status resolution of the user status, the status resolution indicating whether the user status is valid or invalid based on parameters previously set and stored by the user in the second server,
wherein in response to the first server authorizing the login request:
the first server:
  transmits to the second server, a request for a user status associated with the second user,
  performs a credential exchange with the second server,
  in response to a successful credential exchange, receives the user status associated with the second user as valid or invalid,
  authorizes the operation request in response to the user status being set as valid, and
  rejects the operation request in response to the user status being set as invalid, and the second server:
  receives the request for the user status associated with the second server,
  performs the credential exchange with the first server,
  in response to the successful credential exchange, verifies the user status associated with the second user as valid or invalid, and
  sends the verified user status to the first server.

18. A non-transitory computer readable medium comprising a first medium storing a first program, which when executed by a first server computer, causes the first server computer to implement a first method comprising:
  prior to user authentication with the first server, receive a login request from a first user in a name of a second user to be logged into a service of the first server;
  transmit to the second server a request for a user status associated with the second user;
  receive by the first server a request from the second server for credentials of the first server, and transmitting the credentials of the first server to the second server to perform a credential exchange between the first server and the second server;
  in response to a successful credential exchange, receive a status resolution of the user status from the second server; and
  authorizing the login request of the first user in the name of the second user when the status resolution indicates the user status is valid; and
  reject the login request of the first user in the name of the second user when the status resolution indicates the user status is invalid, and
wherein the non-transitory computer readable medium comprises a second medium storing a second program, which when executed by a second server computer, causes the second server computer to implement a second method comprising:
  receive from the first server the request for the user status of the second user;
  transmit the request for credentials to the first server, and receive the credentials from the first server;
  verify the credentials of the first server;
  in response to successfully verifying the credentials of the first server, verify the user status associated with the second user that has been previously set as valid or as invalid by the second user and stored in a memory of the second server, wherein in response to the first server authorizing the login request:

the first method further comprises:
- transmitting to the second server, a request for a user status associated with the second user,
- performing a credential exchange with the second server,
- in response to a successful credential exchange, receiving the user status associated with the second user as valid or invalid,
- authorizing the operation request in response to the user status being set as valid, and
- rejecting the operation request in response to the user status being set as invalid, and the second method further comprises:
- receiving the request for the user status associated with the second server,
- performing the credential exchange with the first server,
- in response to the successful credential exchange, verifying the user status associated with the second user as valid or invalid, and
- sending the verified user status to the first server.

* * * * *